US009824526B2

(12) United States Patent
Hughes et al.

(10) Patent No.: US 9,824,526 B2
(45) **Date of Patent: *Nov. 21, 2017**

(54) GAMING SYSTEM AND METHOD FOR DISPLAYING A PLURALITY OF INDIVIDUAL SYMBOLS AT A SINGLE SYMBOL DISPLAY POSITION

(71) Applicant: IGT, Las Vegas, NV (US)

(72) Inventors: William Keith Hughes, Reno, NV (US); Kelsy J. Grace, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,511

(22) Filed: Feb. 24, 2016

(65) Prior Publication Data

US 2016/0171821 A1 Jun. 16, 2016

Related U.S. Application Data

(63) Continuation of application No. 14/025,490, filed on Sep. 12, 2013, now Pat. No. 9,275,523.

(51) Int. Cl.

*A63F 13/00* (2014.01)
*G07F 17/32* (2006.01)
*G07F 17/34* (2006.01)

(52) U.S. Cl.

CPC ........ *G07F 17/3213* (2013.01); *G07F 17/326* (2013.01); *G07F 17/3241* (2013.01); *G07F 17/3246* (2013.01); *G07F 17/3248* (2013.01); *G07F 17/3258* (2013.01); *G07F 17/3267* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 5,209,479 | A | 5/1993 | Nagao et al. |
| 5,393,061 | A | 2/1995 | Manship et al. |
| 5,395,111 | A | 3/1995 | Inoue |
| 5,449,173 | A | 9/1995 | Thomas et al. |
| 5,611,535 | A | 3/1997 | Tiberio |
| 5,752,861 | A | 5/1998 | Cherry et al. |
| 5,769,716 | A | 6/1998 | Saffari et al. |

(Continued)

FOREIGN PATENT DOCUMENTS

| | | |
|---|---|---|
| AU | 7493687 | 6/1987 |
| AU | 199717601 | 9/1997 |

(Continued)

*Primary Examiner* — Jason Yen

(74) *Attorney, Agent, or Firm* — Neal, Gerber & Eisenberg LLP

(57) ABSTRACT

A gaming system including a game which utilizes one or more designated symbols. In these embodiments, if at least one single individual designated symbol is generated and displayed at at least one single symbol display position, the gaming system modifies the single individual designated symbol into one or more individual designated symbols at the same single symbol display position. This modification of an individual designated symbol into a plurality of individual designated symbols is associated with one or more benefits, such as the availability of one or more awards not previously available prior to the modification.

26 Claims, 9 Drawing Sheets

(56) References Cited

U.S. PATENT DOCUMENTS

| | | | |
|---|---|---|---|
| 5,890,962 | A | 4/1999 | Takemoto |
| 5,980,384 | A | 11/1999 | Barrie |
| 5,997,401 | A | 12/1999 | Crawford |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,095,921 | A | 8/2000 | Walker et al. |
| 6,120,378 | A | 9/2000 | Moody |
| 6,165,070 | A | 12/2000 | Nolte et al. |
| 6,190,254 | B1 | 2/2001 | Bennett |
| 6,220,959 | B1 | 4/2001 | Holmes, Jr. et al. |
| 6,270,411 | B1 | 8/2001 | Gura et al. |
| 6,311,976 | B1 | 11/2001 | Yoseloff et al. |
| 6,315,660 | B1 | 11/2001 | DeMar et al. |
| 6,364,766 | B1 | 4/2002 | Anderson et al. |
| 6,439,993 | B1 | 8/2002 | O'Halloran |
| 6,551,187 | B1 | 4/2003 | Jaffe |
| 6,561,900 | B1 | 5/2003 | Baerlocher et al. |
| 6,565,433 | B1 | 5/2003 | Baerlocher et al. |
| 6,616,142 | B2 | 9/2003 | Adams |
| 6,672,960 | B1 | 1/2004 | B-Jensen |
| 6,855,054 | B2 | 2/2005 | White et al. |
| 6,866,583 | B2 | 3/2005 | Glavich et al. |
| 6,896,615 | B2 | 5/2005 | Berman |
| 6,905,405 | B2 | 6/2005 | McClintic |
| 6,905,406 | B2 | 6/2005 | Kaminkow et al. |
| 6,918,832 | B2 | 7/2005 | Baerlocher et al. |
| 6,981,635 | B1 | 1/2006 | Hughs-Baird et al. |
| 6,988,947 | B2 | 1/2006 | Baerlocher et al. |
| 7,169,042 | B2 | 1/2007 | Muir et al. |
| 7,281,977 | B2 | 10/2007 | Jones |
| 7,371,168 | B2 | 5/2008 | Bilyeu et al. |
| 7,402,102 | B2 | 7/2008 | Marks et al. |
| 7,526,736 | B2 | 4/2009 | Kaminkow et al. |
| 7,585,219 | B2 | 9/2009 | Randall et al. |
| 7,591,724 | B2 | 9/2009 | Baerlocher |
| 7,666,085 | B2 | 2/2010 | Vorias et al. |
| 7,674,173 | B2 | 3/2010 | Bennett |
| 7,695,363 | B2 | 4/2010 | Gilliland et al. |
| 7,740,536 | B2 | 6/2010 | Pederson et al. |
| 7,775,874 | B2 | 8/2010 | Ching et al. |
| 7,850,521 | B2 | 12/2010 | Rodgers et al. |
| 8,002,625 | B2 | 8/2011 | Maya |
| 8,007,357 | B2 | 8/2011 | Cuddy et al. |
| 8,021,226 | B2 | 9/2011 | Souza et al. |
| 8,096,877 | B2 | 1/2012 | Hoffman |
| 8,172,665 | B2 | 5/2012 | Hoffman et al. |
| 8,221,218 | B2 | 7/2012 | Gilliland et al. |
| 8,226,468 | B2 | 7/2012 | Hoffman et al. |
| 8,333,649 | B2 | 12/2012 | Marks et al. |
| 8,360,851 | B2 | 1/2013 | Aoki et al. |
| 8,382,574 | B2 | 2/2013 | Marks et al. |
| 8,430,737 | B2 | 4/2013 | Saunders |
| 2002/0094857 | A1 | 7/2002 | Meyer |
| 2003/0125105 | A1 | 7/2003 | Bennett |
| 2004/0009803 | A1 | 1/2004 | Bennett et al. |
| 2004/0023714 | A1 | 2/2004 | Asdale |
| 2005/0054418 | A1 | 3/2005 | Baerlocher |
| 2008/0032783 | A1 | 2/2008 | Walker et al. |
| 2008/0113739 | A1 | 5/2008 | Visser et al. |
| 2008/0119257 | A1 | 5/2008 | Stern et al. |
| 2008/0182650 | A1* | 7/2008 | Randall .................. G07F 17/32 463/25 |
| 2008/0280673 | A1* | 11/2008 | Marks ................ G07F 17/3211 463/20 |
| 2009/0124347 | A1 | 5/2009 | Rodgers et al. |
| 2009/0170592 | A1 | 7/2009 | Cuddy |
| 2010/0075741 | A1 | 3/2010 | Aoki et al. |
| 2010/0120507 | A1 | 5/2010 | Rodgers et al. |
| 2011/0201406 | A1* | 8/2011 | Jaffe ...................... G07F 17/32 463/21 |
| 2012/0115570 | A1 | 5/2012 | Collette et al. |
| 2012/0172106 | A1 | 7/2012 | Caputo et al. |
| 2012/0322532 | A1 | 12/2012 | Nauman |
| 2013/0053122 | A1 | 2/2013 | Spark-Stahl et al. |
| 2013/0053128 | A1 | 2/2013 | Spark-Stahl et al. |
| 2013/0095906 | A1 | 4/2013 | Marks et al. |
| 2013/0157744 | A1 | 6/2013 | Welty et al. |
| 2013/0184049 | A1 | 7/2013 | Welty et al. |
| 2013/0217463 | A1 | 8/2013 | Hughes et al. |
| 2013/0296014 | A1* | 11/2013 | Nguyen ................. G07F 17/34 463/20 |
| 2014/0080571 | A1 | 3/2014 | Garretsen |

FOREIGN PATENT DOCUMENTS

| | | |
|---|---|---|
| EP | 0060019 | 9/1962 |
| EP | 0410789 | 7/1990 |
| EP | 0698869 | 2/1996 |
| EP | 0984408 | 3/2000 |
| EP | 1205984 | 10/2001 |
| WO | WO00/66235 | 11/2000 |
| WO | WO00/76606 | 12/2000 |

* cited by examiner

GAMING SYSTEM AND METHOD FOR DISPLAYING A PLURALITY OF INDIVIDUAL SYMBOLS AT A SINGLE SYMBOL DISPLAY POSITION

PRIORITY CLAIM

This application is a continuation of, claims the benefit of and priority to U.S. patent application Ser. No. 14/025,490, filed on Sep. 12, 2013, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award).

In one known slot gaming machine, the gaming machine includes a plurality of reels and one or more paylines. Such gaming machines include any suitable number of reels, such as three to five reels, which each display any suitable number of symbols per reel, such as three symbols per reel, wherein each reel includes one symbol displayed in each of a plurality of symbol positions on that reel. Such gaming machines may have one, three, five, nine, fifteen, twenty-five or any other suitable number of paylines which are horizontal, vertical, diagonal or any combination thereof.

In certain known slot gaming machines, upon placing one or more wagers, the reels spin to generate a plurality of symbols and the gaming machine analyzes the generated symbols to determine if the gaming machine has randomly generated a winning symbol or winning symbol combination on or along one or more of the wagered on paylines. Any awards associated with any generated winning symbols or winning symbol combinations generated along any wagered on paylines are provided to the player. Alternatively, any awards associated with any winning symbols or winning symbol combinations that are generated anywhere on a wagered on payline (i.e., a line scatter pay) or anywhere on the reels (i.e., a reel scatter pay) are provided to the player. Modifying the number of generated symbols by either modifying the number of reels or modifying the number of symbols generated in symbol display positions by one or more of the reels, modifies the number of symbols available to form a winning symbol combination.

In another type of gaming machine with reels, the player wagers on a number of ways to win, wherein any award provided to the player is based on the number of associated symbols which are generated in active symbol display positions on a requisite number of adjacent reels (i.e., not on paylines passing through any displayed winning symbol combinations). In such known ways to win gaming machines, the total number of ways to win is determined by multiplying the number of symbols generated in active symbol display positions on a first reel by the number of symbols generated in active symbol display positions on a second reel by the number of symbols generated in active symbol positions on a third reel and so on for each reel of the gaming machine with at least one symbol generated in an active symbol display position. For example, a three reel gaming machine with three symbols generated in active symbol display positions on each reel includes 27 ways to win (i.e., 3 symbols on the first reel×3 symbols on the second reel×3 symbols on the third reel). Modifying the number of generated symbols by either modifying the number of reels or modifying the number of symbols generated in active symbol display positions by one or more of the reels, modifies the number of ways to win.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

There is a continuing need to provide new and different primary games as well as new and different ways to provide awards to players including bonus awards.

SUMMARY

The present disclosure relates generally to gaming systems and methods for displaying a plurality of individual symbols at a single symbol display position.

In various embodiments, the gaming system disclosed herein includes a game which utilizes one or more designated symbols. In these embodiments, if at least one single individual designated symbol is generated and displayed at at least one single symbol display position, the gaming system modifies the single individual designated symbol into one or more individual designated symbols at the same single symbol display position. That is, one or more times, the gaming system multiplies, spawns, bursts, splits, cleaves or divides an individual symbol at an individual symbol display position into a plurality of individual symbols at the individual symbol display position. This modification of an individual designated symbol into a plurality of individual designated symbols is associated with one or more benefits, such as the availability of one or more awards not previously available prior to the modification. Such a configuration provides an increased level of volatility (and excitement for certain players) by modifying the quantity of symbols displayed in association with a play of a game (and correspondingly modifying the range of awards available for the player to win in association with the play of the game).

More specifically, in operation of certain embodiments, for a play of a game, the gaming system generates and displays a symbol (from a plurality of symbols) at each symbol display position of a symbol display position matrix. In these embodiments, the plurality of symbols includes one or more designated individual symbols (i.e., one or more multi-symbols).

Following the initial generation and display of the plurality of symbols at the plurality of symbol display positions, the gaming system determines if any individual designated symbol is generated at any individual symbol display position. In one such embodiment, if an individual designated symbol is generated at an individual symbol display position, the gaming system determines a quantity of symbols to display at the individual symbol display position of the individual designated symbol. In another such embodiment, if an individual designated symbol is generated at an individual symbol display position and that individual designated symbol is part of a winning symbol combination, the gaming system determines a quantity of symbols to display at the individual symbol display position of the individual designated symbol. In another such embodiment, if an individual designated symbol is generated at an individual symbol display position and a designated symbol modification event (i.e., a designated modifying symbols event) occurs, the gaming system determines a quantity of symbols to display at the individual symbol display position of the individual designated symbol.

In these embodiments, after determining a quantity of symbols to display at the individual symbol display position of the generated individual designated symbol, the gaming system modifies the generated individual designated symbol into the determined quantity of symbols. Put differently, one or more times, the gaming system multiplies, spawns, bursts, splits, cleaves or otherwise divides the single generated individual designated symbol into a plurality of symbols which are each displayed at the same symbol display position. For example, if a single individual designated symbol is generated and displayed at a single symbol display position, the gaming system determines to modify this single individual designated symbol into four individual symbols which are each displayed at the same single symbol display position.

Following this modification of one or more designated individual symbols into one or more designated individual symbols, the gaming system evaluates the symbols displayed at the plurality of symbol display positions. In one embodiment, the gaming system provides the player any awards associated with the symbols displayed at the symbol display positions. For example, if a payline runs through three symbol display positions (such that prior to any spawning, a three symbol winning symbol combination associated with a first award is formed along the payline) and the gaming system modifies a designated symbol displayed at one of the three symbol display positions into five individual symbols (at the same symbol display position), the gaming system provides the player a second, greater award associated with the eight symbol winning symbol combination now formed along the payline. In another embodiment, the gaming system triggers a play of a bonus game based on the symbols displayed at the symbol display positions. In this embodiment, one or more features or attributes of the triggered bonus game are based, at least in part, on the quantity of displayed symbols associated with the triggering of the bonus game. For example, if the generation of three designated symbols is associated with a triggering of a bonus game and the gaming system initially generates one designated symbol at one symbol display position, the gaming system is configured to modify that one designated symbol into three individual symbols (at the same symbol display position) and subsequently trigger a play of the bonus game in association with the three displayed designated symbols.

In these embodiments, the gaming system evaluates or otherwise accounts for each of the symbols displayed at each of the symbol display positions such that if a plurality of symbols are displayed at a single symbol display position (as a result of the gaming system modifying a designated symbol into a plurality of designated symbols), the gaming system individually evaluates each of the symbols displayed at the single symbol display position. It should be appreciated that by individually and separately evaluating each of the symbols at each of the symbol display positions, the modifying of one or more designated symbols into a plurality of symbols at the same symbol display position avails the player to one or more awards (or one or more bonus games) not available prior to the modifying of such symbols. That is, by modifying one symbol at one symbol display position into a plurality of symbols at the same symbol display position, the displayed symbols are configured to form one or more winning symbol combinations (or one or more bonus game triggering symbol combinations) that could not be formed without the modification (i.e., spawning) of such a symbol. Such a configuration of increasing the quantity of symbols displayed at a single symbol display position provides an increased level of excitement for certain players by forming different symbol combinations including different quantities of symbols which are associated with different (and potentially more lucrative) awards.

Additional features and advantages are described herein, and will be apparent from the following Detailed Description and the figures.

DETAILED DESCRIPTION

Modifying Symbols

In various embodiments, the gaming system disclosed herein includes a game which utilizes one or more designated symbols. In these embodiments, if at least one single individual designated symbol is generated and displayed at at least one single symbol display position, the gaming system modifies the single individual designated symbol into one or more individual designated symbols at the same single symbol display position. That is, one or more times, the gaming system multiplies, spawns, bursts, splits, cleaves or divides an individual symbol at an individual symbol display position into a plurality of individual symbols at the individual symbol display position. This modification of an individual designated symbol into a plurality of individual designated symbols is associated with one or more benefits, such as the availability of one or more awards not previously available prior to the modification. Such a configuration provides an increased level of volatility (and excitement for certain players) by modifying the quantity of symbols displayed in association with a play of a game (and correspondingly modifying the range of awards available for the player to win in association with the play of the game).

While certain of the embodiments described below are directed to modifying one or more symbols in association with a primary or base game, it should be appreciated that the present disclosure may additionally or alternatively be employed in association with modifying one or more symbols in association with a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
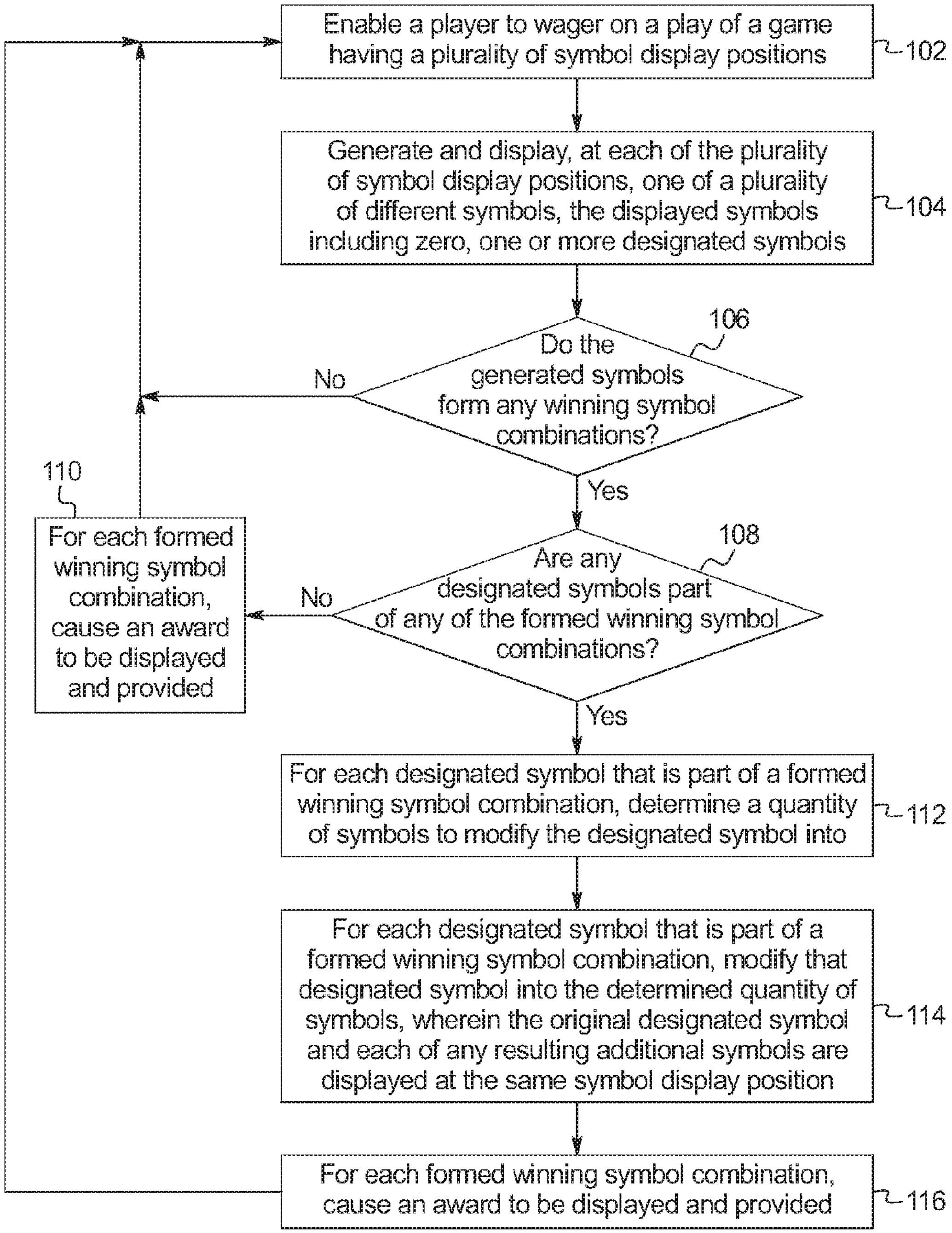
FIG. 1 is a flow chart of an example process for operating a gaming system including modifying a symbol at a symbol display position into a plurality of symbols at the symbol display position as disclosed herein.

Referring now to FIG. 1, a flowchart of an example embodiment of a process for operating a gaming system disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In various embodiments, as indicated in block 102, the gaming system enables a player to wager on a play of a game having a plurality of symbol display positions. In one embodiment, the symbol display positions form a single symbol display position matrix or grid.

For the wagered on play of the game, as indicated in block 104, the gaming system generates and displays, at each of the plurality of symbol display positions, one of a plurality of different symbols. In one embodiment, as further indicated in block 104, zero, one or more of the plurality of displayed symbols are designated symbols (i.e. multi-symbols). As described in more detail below, such designated symbols are configured to spawn or burst into a plurality of symbols.

Figure 2A:
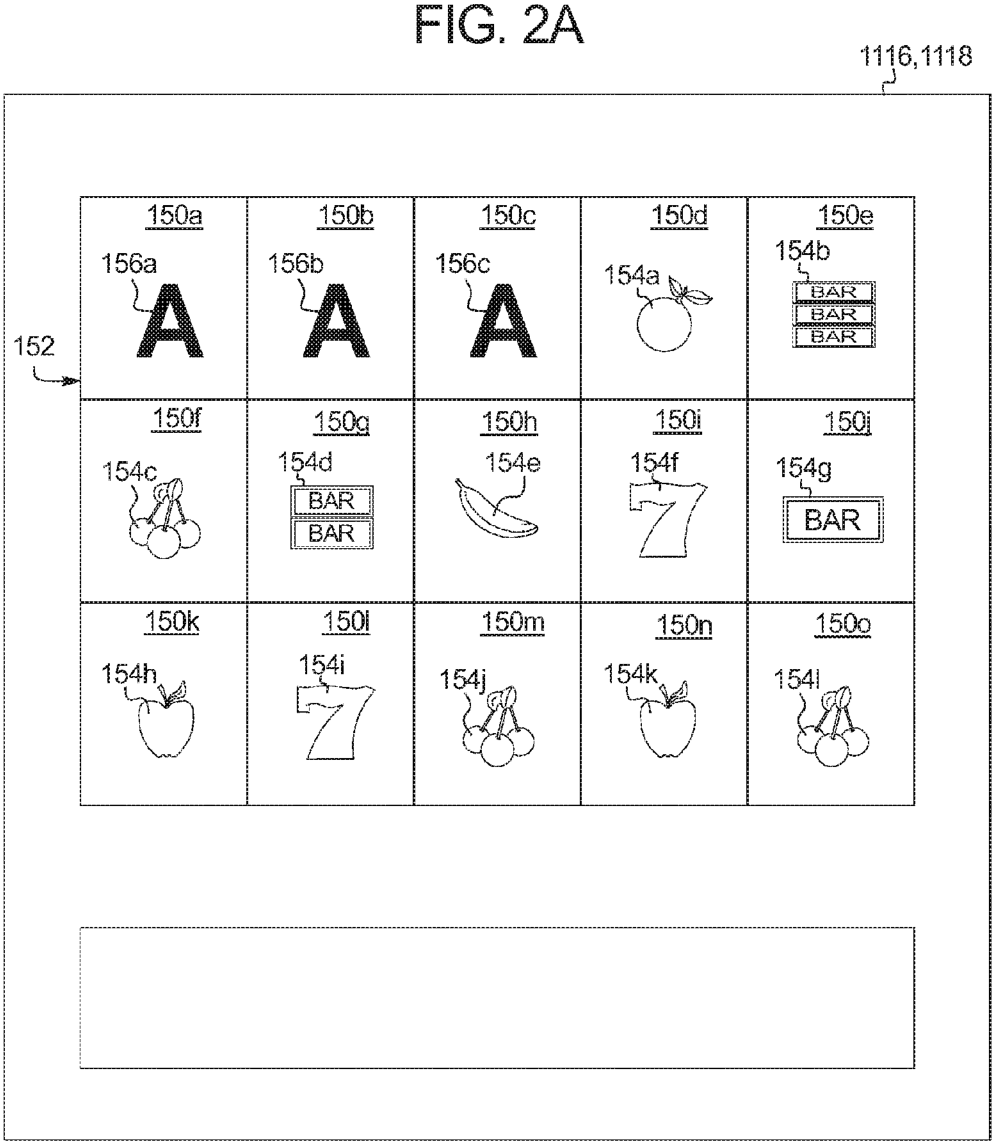
FIGS. 2A, 2B, 2C and 2D are front views of one embodiment of the gaming system disclosed herein illustrating the modification of one symbol at one symbol display position into a plurality of symbols at the one symbol display position.

For example, as seen in FIG. 2A, at a plurality of symbol display positions 150 of a symbol display position grid 152, the gaming system generates a symbol 154. Specifically, as seen in FIG. 2A, the gaming system generated symbols 154*a*, 154*b*, 154*c*, 154*d*, 154*e*, 154*f*, 154*g*, 154*h*. 154*i*, 154*j*, 154*k*, and 154*l* at symbol display positions 150*d*, 150*e*, 150*f*, 150*g*, 150*h*, 150*i*, 150*j*, 150*k*, 1501, 150*m*, 150*n* and 150*o*, respectively, of symbol display position grid 152. As also seen in FIG. 2A, the gaming system generated designated symbols 156*a*, 156*b* and 156*c* at symbol display position 150*a*, 150*b* and 150*c*, respectively of symbol display position grid 152. As seen in this example, designated symbol 156*a*, 156*b* and 156*c* are each respectively initially displayed as a single symbol at a single symbol display position.

Following the generation and display of the plurality of symbols at the plurality of symbol display positions, the gaming system determines whether the generated symbols form any winning symbol combinations as indicated in diamond 106 of FIG. 1.

If the generated symbols did not form any winning symbol combinations, the gaming system terminates the play of the primary game and returns to block 102 for another placement of another wager on any play of the primary game.

On the other hand, if the generated symbols form one or more winning symbol combinations, as indicated in diamond 108, the gaming system determines if any designated symbols are part of any of the formed winning symbol combinations.

If no designated symbols are part of any winning symbol combinations, for each formed winning symbol combination, the gaming system causes an award to be displayed and provided as indicated in block 110. The gaming system then terminates the play of the primary game and returns to block 102 for another placement of another wager on any play of the primary game.

On the other hand, if a designated symbol is part of a formed winning symbol combination, for each designated symbol that is part of a formed winning symbol combination, the gaming system determines a quantity of symbols to modify the designated symbol into as indicated in block 112. That is, the gaming system determines how many symbols to spawn, burst, cleave or otherwise divide the designated symbol into.

Figure 2B:
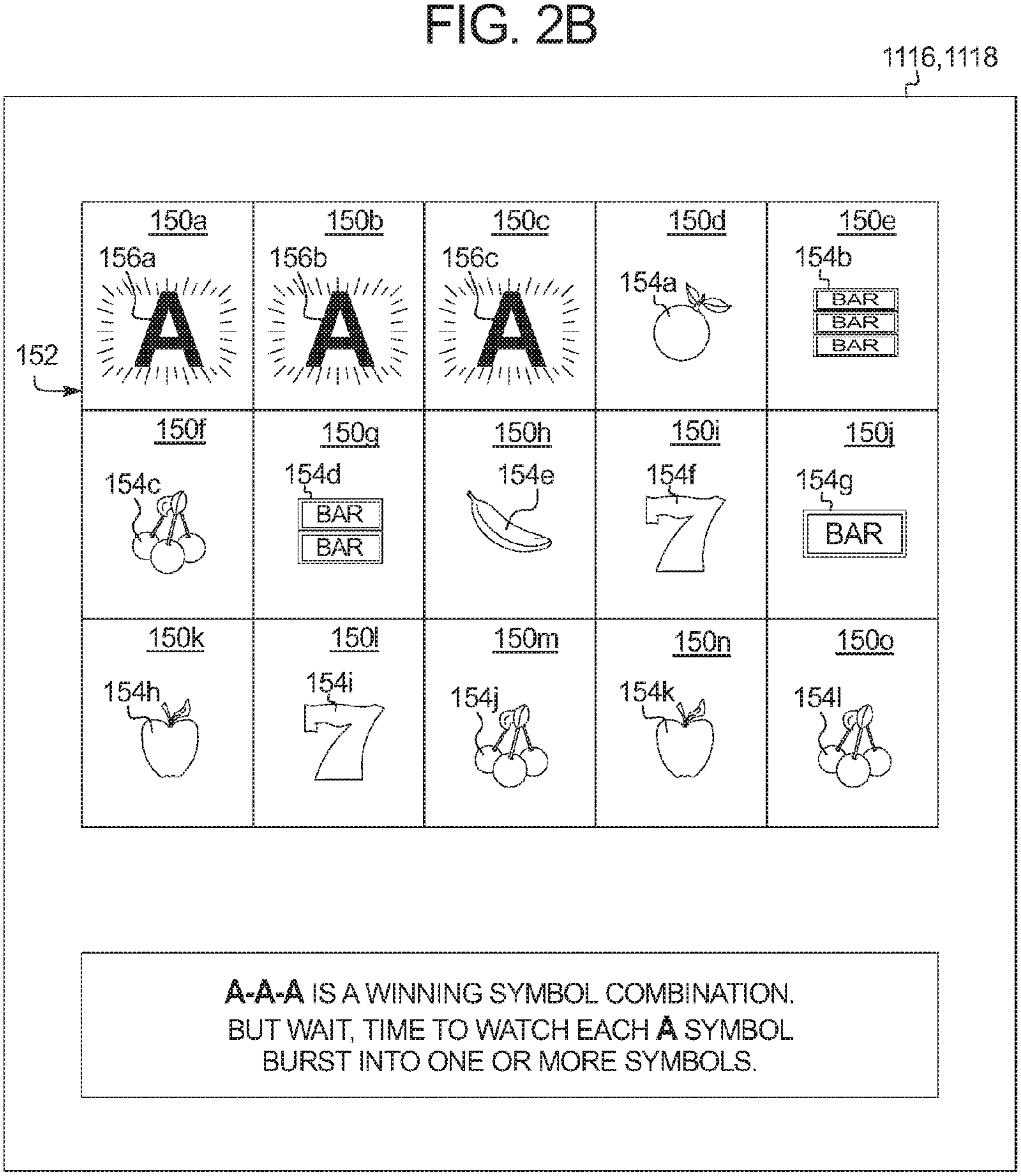

For example, as seen in FIG. 2B, the gaming system determines that since designated symbols 156*a*, 156*b* and 156*c* form a winning symbol combination, the gaming system will modify each of designated symbols 156*a*, 156*b* and 156*c* into one or more symbols. In this example, the gaming system provides appropriate messages such as "A-A-A IS A WINNING SYMBOL COMBINATION" and "BUT WAIT, TIME TO WATCH EACH A SYMBOL BURST INTO ONE OR MORE SYMBOLS" to the player visually, or through suitable audio or audiovisual displays.

In one embodiment, the determination of the quantity of symbols to modify the designated symbol into is based on one or more random determinations. In one such embodiment, the designated symbol is associated with a weighted table wherein the gaming system selects, from the weighted table, the quantity of symbols to modify the designated symbol into. In one embodiment, each of the quantities have the same probability of being selected. In another embodiment, at least two of the quantities have different probabilities of being selected. In another embodiment, each of the quantities have a different probability of being selected. In one embodiment, each of the designated symbols utilizes the same weighted table. In another embodiment, different designated symbols utilize different weighted tables.

In another embodiment, the quantity of symbols to modify the designated symbol into is based, at least in part, on the location of the designated symbol. In one such embodiment, different symbol display positions of different reels (or columns) are associated with different quantities of symbols. In another such embodiment, different symbol display positions of different reels (or columns) are associated with different maximum quantities of symbols. For example, symbol display positions of columns one and five (with column one being the leftmost column and column five being the rightmost column) are associated with a maximum quantity of two symbols, symbol display positions of columns two and four are associated with a maximum quantity of three symbols and symbol display positions of column three are associated with a maximum of five symbols. In this example, if a winning symbol combination includes a designated symbol that spans across all five columns, the gaming system is configured to modify these five designated symbols into up to fifteen symbols.

In another embodiment, the quantity of symbols to modify the designated symbol into is based, at least in part, on the type of generated and displayed designated symbol. In one such embodiment, different designated symbols are associated with different quantities of symbols. In another such embodiment, different designated symbols are associated with different maximum quantities of symbols. For example, a first type of designated symbol is associated with a maximum quantity of five symbols and a second, different type of designated symbol is associated with a maximum quantity of two symbols. In this example, if a winning symbol combination includes five of the first type of designated symbol, the gaming system is configured to modify these five first type designated symbols into up to twenty-five symbols. In another example, if a winning symbol combination includes five of the second type of designated symbol, the gaming system is configured to modify these five second type designated symbols into up to ten symbols. In another example, if a winning symbol combination includes three of first type of designated symbol and two of the second type of designated symbol, the gaming system is configured to modify these five designated symbols into up to nineteen symbols.

In another embodiment, the gaming system employs one or more symbol quantity selection sequences to select the quantity of symbols to modify the designated symbol into. In one such embodiment, a symbol quantity selection sequence includes a symbol quantity generator, such as a wheel with each of the different available symbol quantities indicated in a different section of the wheel. In this embodiment, the symbol quantity generator spins and the quantity of symbols indicated by an indicator determines the quantity of symbols the designated symbol is modify into. In another such embodiment, a symbol quantity selection sequence includes a symbol quantity reel with different symbol display positions associated with the different available quantities of symbols. In this embodiment, the symbol quantity reel spins and the quantity of symbols associated with the symbol display position which aligns with a payline determines which quantity of symbols to modify the designated symbol into. In another such embodiment, a symbol quantity selection sequence includes a plurality of selections wherein each of the selections is associated with one of the quantities of symbols. In this embodiment, the gaming system enables the player to pick one or more selections wherein the gaming system determines which quantity of symbols to modify the designated symbol into based on the player's picked selections. It should be appreciated that any suitable symbol quantity selection sequence may be employed in association with determining a quantity of symbols to modify the designated symbol into. In different embodiments, one or more symbol quantity selection sequences include, but are not limited to: a play of any suitable slot game; a play of any suitable free spins or free game activations; a play of any suitable wheel game; a play of any suitable card game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window; a play of any suitable game on a mobile device; and/or a play of any suitable game disclosed herein.

In another embodiment, the quantity of symbols to modify each designated symbol into is predetermined. In this embodiment, although the gaming system displays a plurality of designated symbols as the same designated symbol, these plurality of designated symbols are predetermined to be associated with different quantities of symbols.

After determining the quantity of symbols to modify each designated symbol into, as indicated in block 114, for each designated symbol that is part of a formed winning symbol combination, the gaming system modifies that designated symbol into the determined quantity of symbols, wherein the original designated symbol and each of any resulting additional symbols are displayed at the same symbol display position. That is, after determining a quantity of symbols to display at the individual symbol display position of the generated individual designated symbol, the gaming system modifies the generated individual designated symbol into the determined quantity of symbols. Put differently, for each single generated designated symbol that forms part of a winning symbol combination, the gaming system multiplies, spawns, bursts, splits, cleaves or divides the single generated individual designated symbol into a plurality of symbols which are each displayed at the same symbol display position.

Figure 2C:
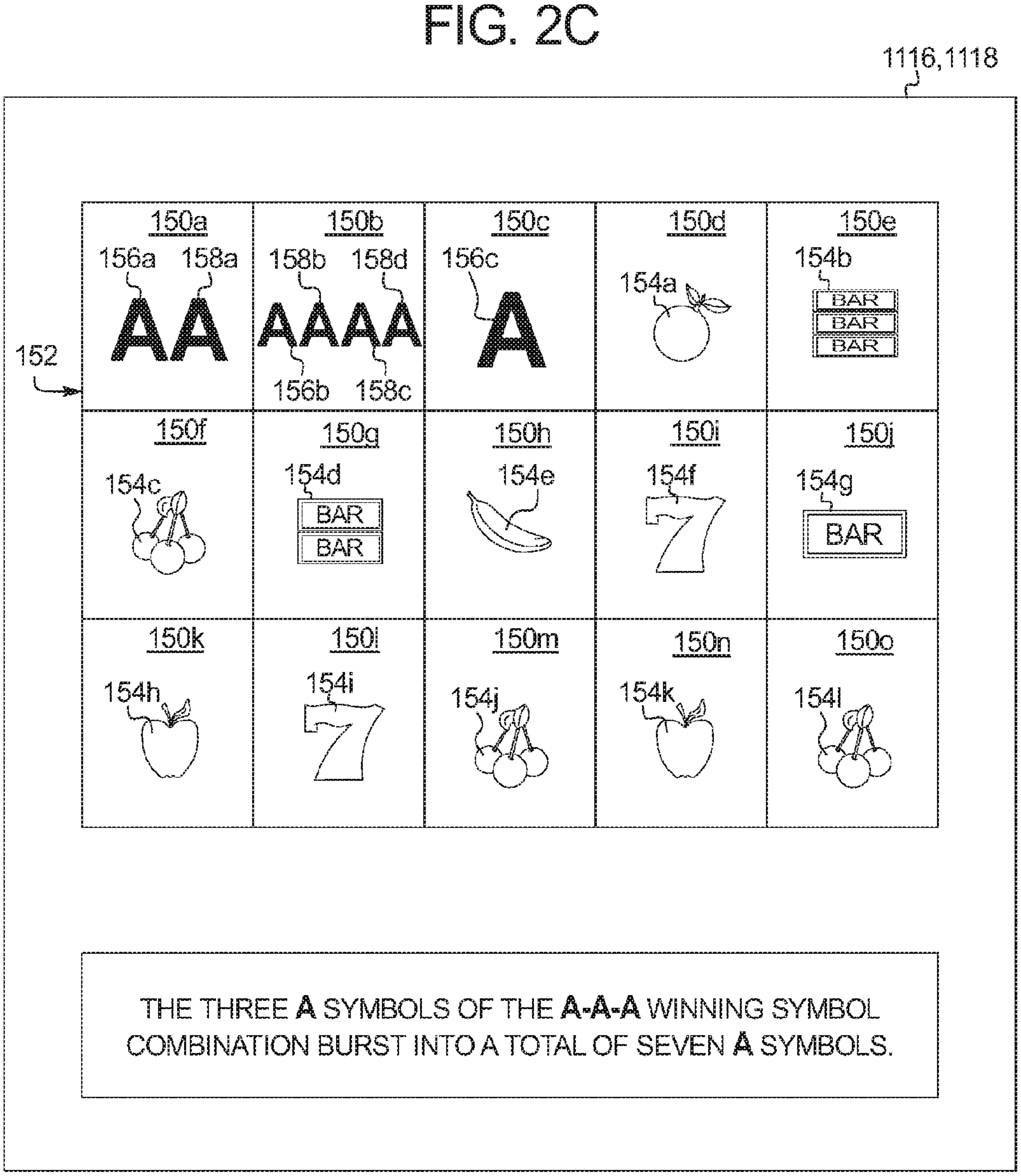

As seen in FIG. 2C, the gaming system modified the three designated symbols 156 into seven designated symbols 158. More specifically, the gaming system modified: (i) designated symbol 156*a* into designated symbols 156*a* (i.e., the original designated symbol) and symbol 158*a*, and (ii) designated symbol 156*b* into designated symbols 156*b* (the original designated symbol), symbols 158*b*, 158*c*, and 158*d*. It should be appreciated that in this example, while the gaming system determined to modify designated symbols 156*a* and 156*h* each into a plurality of designated symbols, the gaming system also determined not to modify designated symbol 156*c* into any additional symbols. In this example, the gaming system provides appropriate messages such as "THE THREE A SYMBOLS OF THE A-A-A WINNING SYMBOL COMBINATION BURST INTO A TOTAL OF SEVEN A SYMBOLS" to the player visually, or through suitable audio or audiovisual displays.

Following the modification of one or more designated symbols into one or more symbol display positions, for each formed winning symbol combination, the gaming system causes an award to be displayed and provided as indicated in block 116. In this embodiment, the gaming system evaluates each of the symbols displayed at each symbol display position in determining any awards to provide to the player. That is, the gaming system evaluates or otherwise accounts for each of the symbols displayed at each of the symbol display positions such that if a plurality of symbols are displayed at a single symbol display position (as a result of the gaming system modifying a designated symbol into a plurality of designated symbols), the gaming system individually evaluates each of the symbols displayed at the single symbol display position.

Figure 2D:
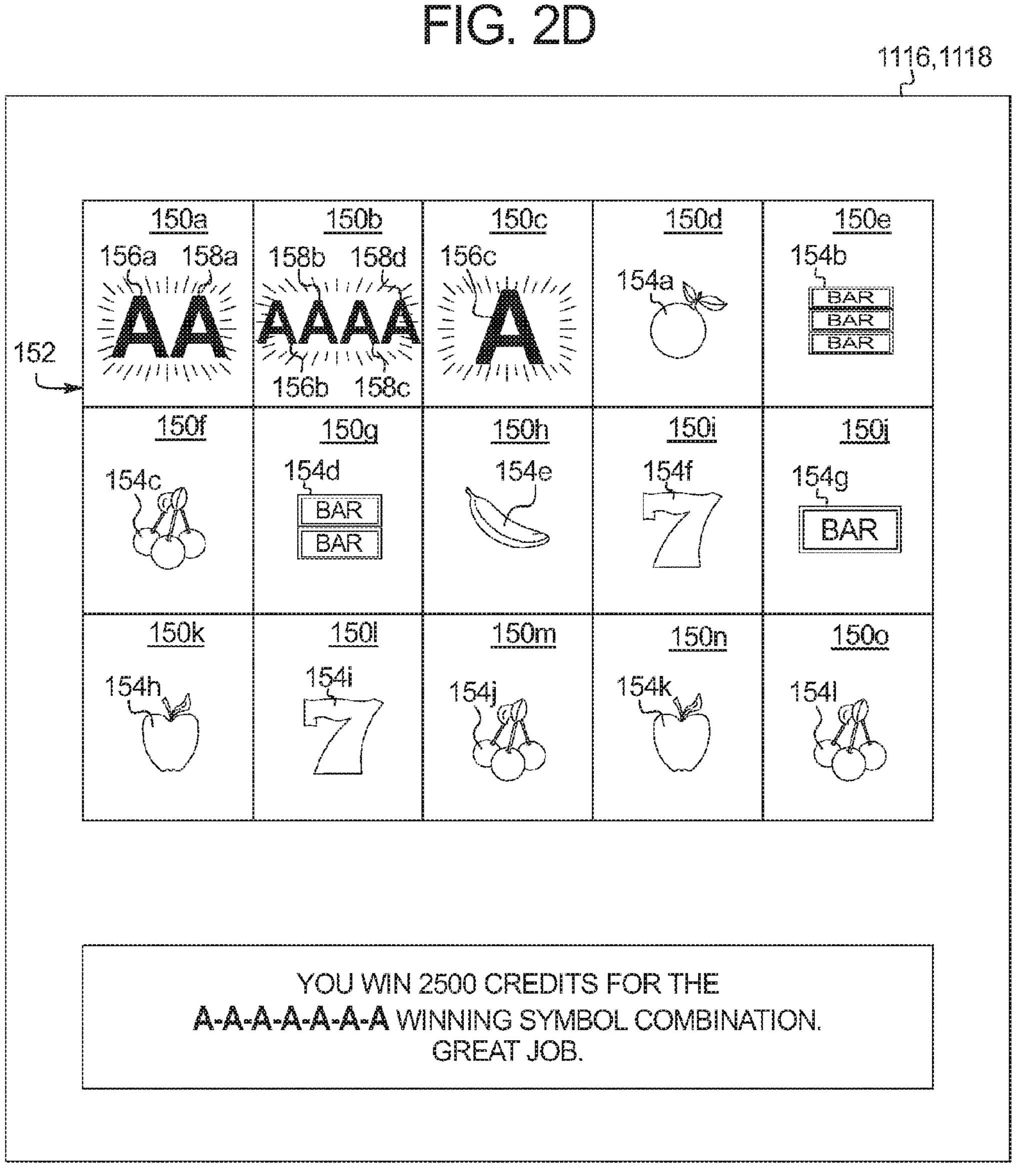

For example, as seen in FIG. 2D, the gaming system determines an award of two-thousand-five-hundred credits associated with the seven winning symbol combination including designated symbol 156*a* and symbol 158*a* (displayed at symbol display position 150*a*), designated symbol 156*b*, and symbols 158*b*, 158*c*, and 158*d* (displayed at symbol display position 150*b*) and designated symbol 156*c* (displayed at symbol display position 150*c*). In this example, the gaming system provides appropriate messages such as "YOU WIN 2500 CREDITS FOR THE A-A-A-A-A-A-A WINNING SYMBOL COMBINATION" and "GREAT JOB" to the player visually, or through suitable audio or audiovisual displays.

Following causing an award to be displayed and provided for each winning symbol combination, the gaming system terminates the play of the primary game and returns to block 102 for another placement of another wager on any play of the primary game.

Accordingly, one embodiment of the gaming system disclosed herein is configured to display, at each of a plurality of symbol display positions, one of a plurality of symbols, wherein the plurality of symbols includes at least one designated symbol and for each of any displayed designated symbols associated with an occurrence of a designated symbol modification event: determine a quantity of symbols, and at the symbol display position of the displayed designated symbol, display the determined quantity of symbols. In this embodiment, the gaming system is configured to determine if any of the displayed symbols form any winning symbol combinations, wherein for each symbol display position, if a plurality of the displayed symbols are displayed at the symbol display position, the determination is based on each of the symbols displayed at the symbol display position. If a plurality of the displayed symbols form at least one winning symbol combination, the gaming system is configured to display one of a plurality of awards for each displayed winning symbol combination.

It should be appreciated that by individually and separately evaluating each of the symbols at each of the symbol display positions, the modification of one or more designated symbols into a plurality of symbols at the same symbol display position avails the player to one or more awards (or one or more bonus games) not available prior to the modification of such symbols. That is, by modifying one symbol at one symbol display position into a plurality of symbols at the same symbol display position, the displayed symbols are configured to form one or more winning symbol combinations (or one or more bonus game triggering symbol combinations) that could not be formed without the modification of such a symbol. For example, as seen in FIGS. 2A to 2D, the modifying of the generated three winning symbol combination into a seven winning symbol combination avails the player to a greater award (and a more favorable gaming experience).

In certain embodiments (not shown), the gaming system utilizes one or more modified symbols to determine whether to trigger a bonus or secondary game. In these embodiments, in addition or alternative to utilizing one or more modified symbols to increase the quantity of symbols which form part of a winning symbol combination, the gaming system employs the modification of such designated symbols in association with the triggering of one or more bonus or secondary games and/or in association with one or more features or attributes of a triggered bonus or secondary game.

In one such embodiment, the gaming system determines whether or not to trigger a bonus or secondary game based on the quantity of designated symbols displayed in association with a play of a primary game. In this embodiment, if at least one designated symbol is generated and displayed, but the quantity of designated symbols displayed is less than the threshold quantity of designated symbols to trigger a bonus game, the modification of such designated symbols (at the same symbol display position) may increase the quantity of displayed designated symbols to reach the threshold quantity. For example, if three or more scattered designated symbols triggers a free spin bonus game and only one designated symbol is generated and displayed in association with the play of the primary game, then if that one designated symbol spawns or bursts (as described above) into at least three designated symbols (at the same symbol display position), the gaming system triggers the free spin bonus game. On the other hand, in this example, if the one designated symbol spawns or bursts (as described above) into less than three designated symbols (at the same symbol display position), the gaming system does not trigger the free spin bonus game.

In another such embodiment, the gaming system determines one or more attributes of a triggered bonus or secondary game based on the quantity of designated symbols displayed in association with a play of a primary game. In this embodiment, different quantities of displayed designated symbols (including any displayed designated symbols resulting from the modification of any designated symbols) determine different attributes or features of a triggered secondary game. In one such embodiment, the greater the quantity of displayed designated symbols, the greater the attributes or features of the triggered secondary game (and the greater the average expected payout of the triggered secondary game). For example: (i) two displayed designated symbols (including any displayed designated symbols resulting from the modification of any designated symbols) is associated with a secondary game including five free spins, (ii) three displayed designated symbols (including any displayed designated symbols resulting from the modification of any designated symbols) is associated with a secondary game including seven free spins, (iii) four displayed designated symbols (including any displayed designated symbols resulting from the modification of any designated symbols) is associated with a secondary game including nine free spins, (iv) five displayed designated symbols (including any displayed designated symbols resulting from the modification of any designated symbols) is associated with a secondary game including eleven free spins, and (v) six displayed designated symbols (including any displayed designated symbols resulting from the modification of any designated symbols) is associated with a secondary game including fifteen free spins.

In different embodiments, the quantity of designated symbols (including any designated symbols resulting from any symbol modifications) are associated with the activation, modification or reconfiguration of one or more features associated with one or more plays of one or more primary games and/or one or more plays of any suitable secondary game. In different such embodiments, these activations, modifications and reconfigurations include, but are not limited to:

i. a stacked wild symbols feature;
ii. a book-end wild symbols feature;
iii. an expanding wild symbols feature;
iv. a wild reel feature;
v. a retrigger symbol feature;
vi. an anti-terminator symbol feature;
vii. a locking reel feature, viii. a locking symbol position feature;

ix. a modification of an amount of credits of a credit balance;

x. a modification of an amount of promotional credits;

xi. a modification of a placed wager amount;

xii. a modification of a wager amount available to be placed;

xiii. a modification of a placed side wager amount;

xiv. a modification of a side wager amount available to be placed;

xv. a modification of a rate of earning player tracking points;

xvi. a modification of a number of wagered on paylines;

xvii. a modification of a number of paylines available to be wagered on;

xviii. a modification of a wager placed on one or more paylines (or on one or more designated paylines);

xix. a modification of a number of ways to win wagered on;

xx. a modification of a number of available ways to win to be wagered on;

xxi. a modification of a wager placed on one or more ways to win (or on one or more designated ways to win);

xxii. a modification of a paytable utilized for a play of a game;

xxiii. an application of a modifier, such as a multiplier or an additional quantity of credits, to one or more awards of a paytable utilized for a play of a game, xxiv. a modification of an average expected payback percentage of a play of a game;

xxv. a modification of an average expected payout of a play of a game;

xxvi. a modification of one or more awards available;

xxvii. a modification of a range of awards available;

xxviii. a modification of a type of awards available;

xxix. a modification of one or more progressive awards;

xxx. a modification of which progressive awards are available to be won;

xxxi. a modification of one or more modifiers, such as multipliers, available;

xxxii. a modification of an activation of a reel (or a designated reel);

xxxiii. a modification of an activation of a plurality of reels;

xxxiv. a modification of a generated outcome (or a designated generated outcome);

xxxv. a modification of a generated outcome (or a designated generated outcome) associated with an award over a designated value;

xxxvi. a modification of a generated outcome (or a designated generated outcome) on a designated payline;

xxxvii. a modification of a generated outcome (or a designated generated outcome) in a scatter configuration;

xxxviii. a modification of a winning way to win (or a designated winning way to win);

xxxix. a modification of a designated symbol or symbol combination;

xl. a modification of a generation of a designated symbol or symbol combination on a designated payline;

xli, a modification of a generation of a designated symbol or symbol combination in a scatter configuration;

xlii. a modification of a triggering event of a play of a secondary or bonus game;

xliii. a modification of an activation of a secondary or bonus display (such as an award generator);

xliv. a modification of a quantity of activations of a secondary or bonus display (e.g., a modification of a quantity of spins of an award generator);

xlv. a modification of a quantity of sections of a secondary or bonus display (e.g., a modification of a quantity of sections of an award generator);

xlvi. a modification of one or more awards of a secondary or bonus display;

xlvii. a modification of an activation of a community award generator;

xlviii. a modification of a quantity of activations of a community award generator;

xlix. a modification of a quantity of sections of a community award generator;

l. a modification of one or more awards of a community award generator;

li. a modification of a quantity of picks in a selection game;

lii. a modification of a quantity of offers in an offer and acceptance game;

liii. a modification of a quantity of moves in a trail game;

liv. a modification of a generated outcome (or a designated generated outcome) in a secondary game;

lv. a modification of an amount of free spins provided;

lvi. a modification of a game terminating or ending condition;

lvii. a modification of how one or more aspects of one or more games (e.g., colors, speeds, sound) are displayed to a player;

lvii. a modification of access to different websites a player may access via a mobile device;

lix. a modification of audio-visual content a player may access via a mobile device;

lx. a modification of a player's avatar; and/or lxi. a modification of any game play feature associated with any play of any game disclosed herein.

In one embodiment, as described above, the wagered on play of the game is associated with a symbol display position matrix. In another embodiment, the wagered on play of the game is associated with a plurality of symbol display position matrixes or grids. In one such embodiment, the player's wager is associated with generating and displaying symbols at each of the symbol display positions of the plurality of symbol display position matrices. In another such embodiment, the gaming system enables a player to place a plurality of wagers on a plurality of available games wherein each game includes or is otherwise associated with a symbol display position matrix (i.e., the gaming system enables the player to simultaneously, concurrently or overlappingly play a plurality of games).

In one embodiment, as described above, if an individual designated symbol is generated at an individual symbol display position and that individual designated symbol is part of a winning symbol combination, the gaming system determines a quantity of symbols to display at the individual symbol display position of the individual designated symbol. In another embodiment, if an individual designated symbol is generated at an individual symbol display position, the gaming system determines a quantity of symbols to display at the individual symbol display position of the individual designated symbol. In this embodiment, the gaming system modifies zero, one or more designated symbols regardless of if such designated symbols are part of any winning symbol combinations. In another such embodiment, In another embodiment, if an individual designated symbol is generated at an individual symbol display position and a designated symbol modification event (i.e. a designated symbol modification event) occurs, the gaming system determines a quantity of symbols to display at the individual symbol display position of the individual designated symbol.

In one embodiment, the gaming system determines one or more symbols to modify, wherein any symbol selected to be modified is classified as a designated symbol. In this embodiment, in addition or alternatively to modifying one or more predetermined designated symbols (as described above), the gaming system selects zero, one or more symbols, reclassifies such symbols as designated symbols and then determines whether to spawn or otherwise modify the quantity of those symbols. In another embodiment, the gaming system determines zero, one or more reels and then designates zero, one or more symbols of the determined reel(s) as a designated symbol. In this embodiment, in addition or alternatively to modifying one or more predetermined designated symbols (as described above), the gaming system selects zero, one or more reels, selects zero, one or more symbols on the selected reel(s), reclassifies such symbols as designated symbols and then determines whether to spawn or otherwise modify the quantity of those symbols.

In one embodiment, if the gaming system modifies a designated symbol into a plurality of symbols (each displayed at the same symbol display position), each of the plurality of symbols are the same symbol (or related symbols). In another embodiment, if the gaming system modifies a designated symbol into a plurality of symbols (each displayed at the same symbol display position), a plurality of the symbols are different symbols. In another embodiment, if the gaming system modifies a designated symbol into a plurality of symbols (each displayed at the same symbol display position), each of the plurality of symbols are different symbols.

In one embodiment, as described above, the gaming system provides the player any awards associated with any winning symbol combinations and then terminates the play of the game. In another embodiment, the modifying symbol quantity per symbol display position game is employed in association with a cascading symbol or tumbling reels game. In this embodiment, after providing an award for each of any formed winning symbol combinations, the gaming system: (i) removes one or more of the displayed symbols to create one or more empty symbol display positions, (ii) shifts zero, one, or more of the remaining displayed symbols into zero, one, or more of the created empty symbol display positions, (iii) displays a symbol for each remaining empty symbol display position, and (iv) evaluates the displayed symbols and provides any award for any winning symbol combinations formed.

In different embodiments, one or more awards provided in association with one or more primary game plays, and/or one or more secondary game plays include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one electronic gaming machine to display the play of the game employing modifying a designated symbol into a plurality of symbols at the same symbol display position. In another embodiment, in addition or in alternative to each electronic gaming machine displaying the play of the game employing modifying a designated symbol into a plurality of symbols at the same symbol display position, the gaming system causes one or more community or overhead display devices to display part or all of the play of the game employing modifying a designated symbol into a plurality of symbols at the same symbol display position to one or more other players or bystanders either at a gaming establishment or viewing over a network, such as the internet. In another embodiment, in addition or in alternative to each electronic gaming machine displaying the play of the game employing modifying a designated symbol into a plurality of symbols at the same symbol display position, the gaming system causes one or more internet sites to each display the play of the game employing modifying a designated symbol into a plurality of symbols at the same symbol display position such that a player is enabled to log on from a personal web browser. In another such embodiment, the gaming system enables the player to play one or more games on one device while viewing the play of the game employing modifying a designated symbol into a plurality of symbols at the same symbol display position from another device, such as a desktop or laptop computer.

In one embodiment, as described above, a game employing modifying a designated symbol into a plurality of symbols at the same symbol display position is a primary or base wagering game. In this embodiment, upon a placement of a wager by a player, the gaming system triggers a play of the game employing modifying a designated symbol into a plurality of symbols at the same symbol display position.

In another embodiment, the game employing modifying a designated symbol into a plurality of symbols at the same symbol display position is a secondary or bonus game which is triggered in response to an occurrence of a game employing modifying a designated symbol into a plurality of symbols at the same symbol display position triggering event. In one such embodiment, a game employing modifying a designated symbol into a plurality of symbols at the same symbol display position triggering event occurs, based on an outcome associated with one or more plays of any primary game and/or an outcome associated with one or more plays of any secondary game. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a game employing modifying a designated symbol into a plurality of symbols at the same symbol display position triggering event to occur.

In another embodiment, the gaming system does not provide any apparent reasons to the players for a game employing modifying a designated symbol into a plurality of symbols at the same symbol display position triggering event to occur. In these embodiments, such determinations are not triggered by an event in a primary game or based specifically on any of the plays of any primary games or on any of the plays of any secondary games. That is, these events occur without any explanation or alternatively with simple explanations.

In one such embodiment, a spawning symbols game triggering event occurs based on an amount of coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In another such embodiments spawning symbols game triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the bonus threshold virtual currency-in amount, the gaming system causes one or more of such events or conditions to occur. In different embodiments, the threshold coin-in amount and/or the virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a spawning symbols game triggering event occurs based on an amount of coin-out. In this embodiment, the gaming system determines if an amount of coin-out wagered at one or more gaming devices in the gaming system reaches or exceeds a designated amount of coin-out (i.e., a threshold coin-out amount). Upon the amount of coin-out wagered at one or more gaming devices in the gaming system reaching or exceeding the bonus threshold coin-out amount, the gaming system causes one or more of such events or conditions to occur. In another such embodiment, a spawning symbols game triggering event occurs based on an amount of virtual currency-out. In this embodiment, the gaming system determines if an amount of virtual currency-out wagered reaches or exceeds a designated amount of virtual currency-out (i.e., a threshold virtual currency-out amount). Upon the amount of virtual currency-out wagered reaching or exceeding the bonus threshold virtual currency-out amount, the gaming system causes one or more of such events or conditions to occur. In different embodiments, the threshold coin-out amount and/or the virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiments, a spawning symbols game triggering event occurs based on a predefined variable reaching a defined parameter threshold. For example, when the 500,000$^{th}$ player has played a gaming device of the gaming system (ascertained from a player tracking system), one or more of events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a spawning symbols game triggering event occurs based on a quantity of games played. In this embodiment, a quantity of games played is set for when one or more of events or conditions will occur. In one embodiment, such a set quantity of games played is based on historic data.

In another alternative embodiment, a spawning symbols game triggering event occurs based on time. In this embodiment, a time is set for when one or more of events or conditions will occur. In one embodiment, such a set time is based on historic data.

In another alternative embodiment, a spawning symbols game triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for events or conditions to occur based on the player's card level.

In another alternative embodiment, a spawning symbols game triggering event occurs based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of events occur may the same as, substantially the same as, or different than the criteria for determining whether a player is in active status or inactive status for another one of such events to occur.

In another alternative embodiment, a spawning symbols game triggering event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of events or conditions occur. It should be appreciated that any suitable manner of causing a game employing modifying a designated symbol into a plurality of symbols at the same symbol display position triggering event to occur may be implemented in accordance with the gaming system and method disclosed herein.

It should be appreciated that any of the above-described spawning symbols game triggering events may be combined in one or more different embodiments.

Alternative Embodiments

It should be appreciated that in different embodiments, one or more of:

i. a quantity of designated symbols to generate and display;
ii. a quantity of designated symbols which may modify into one or more designated symbols at the same symbol display position;
iii. which designated symbols may modify into one or more designated symbols at the same symbol display position;
iv. a quantity of designated symbols one or more designated symbols modify into;
v. which awards are associated with which winning symbol combinations including one or more designated symbols;
vi. a quantity of designated symbols associated with a triggering of a secondary game;
vii. which secondary game attributes are associated with which quantities of designated symbols; and/or
viii. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
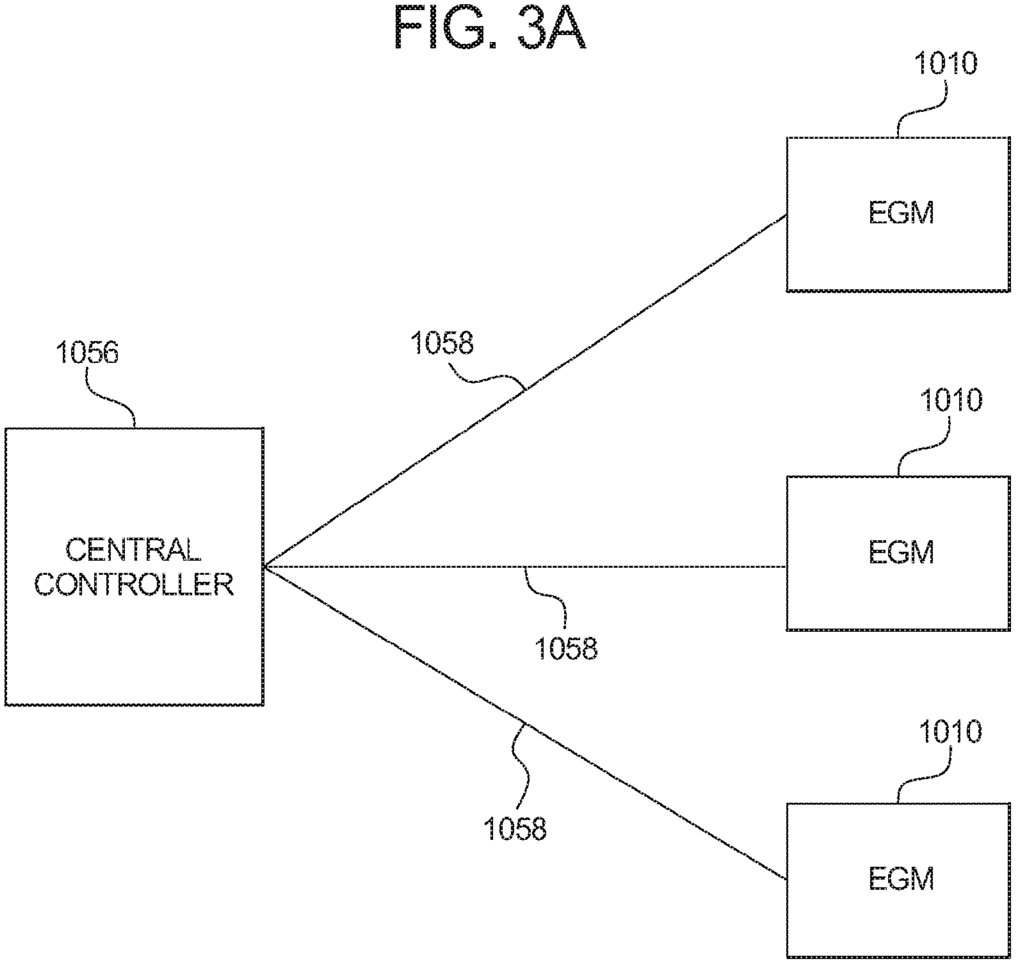
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
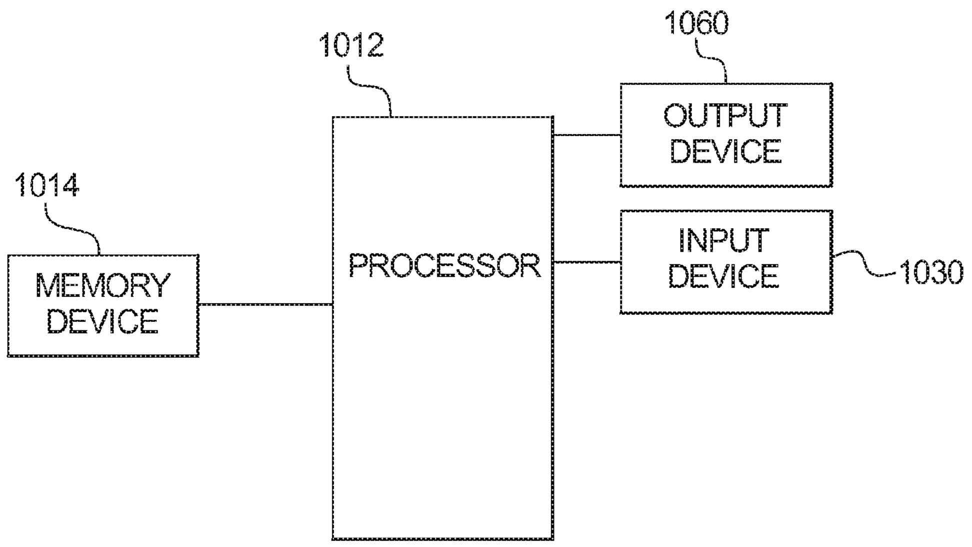
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CO ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
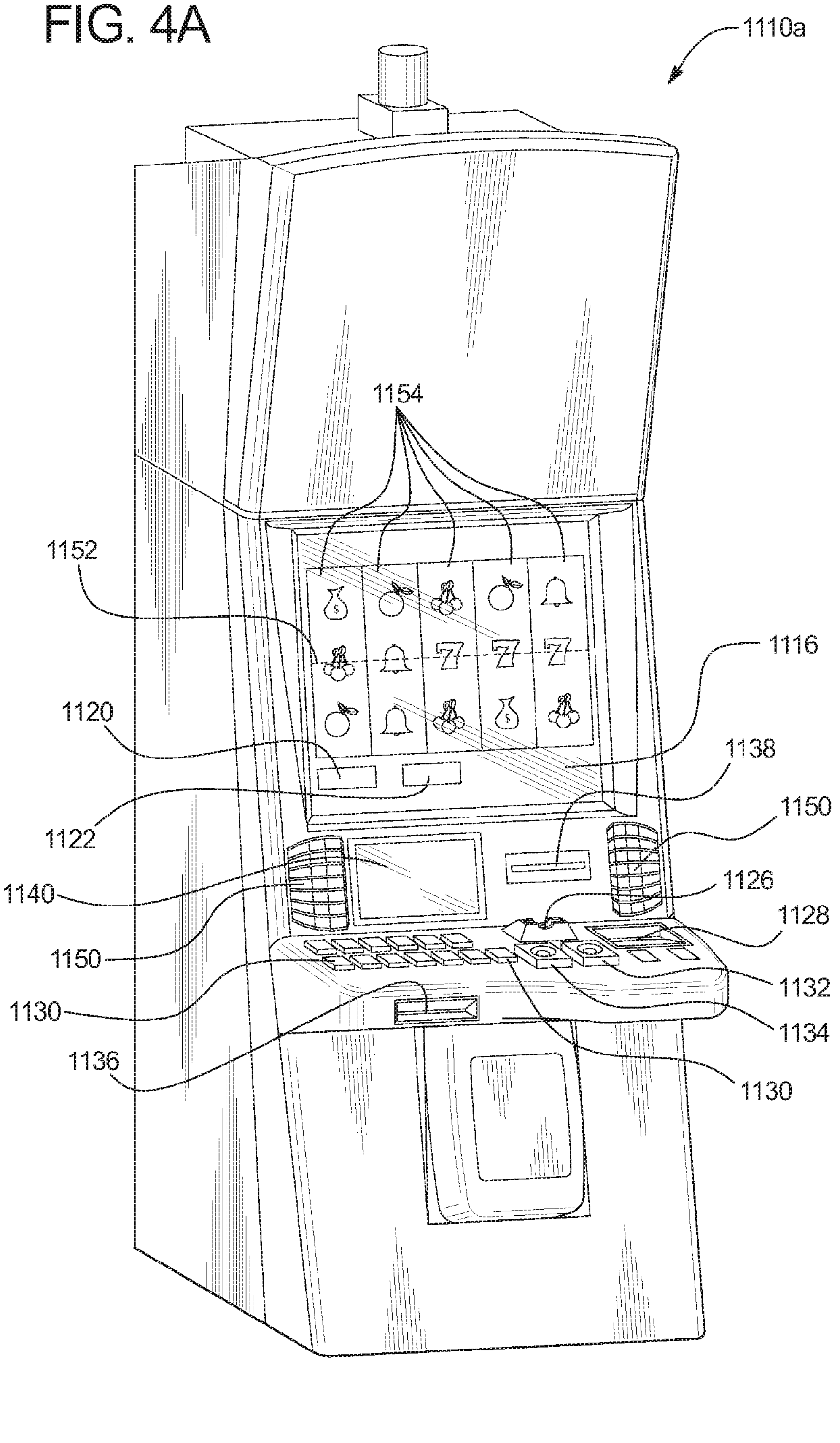
FIGS. 4A and 4B are perspective views of example alternative embodiments of the gaming system disclosed herein.
Figure 4B:
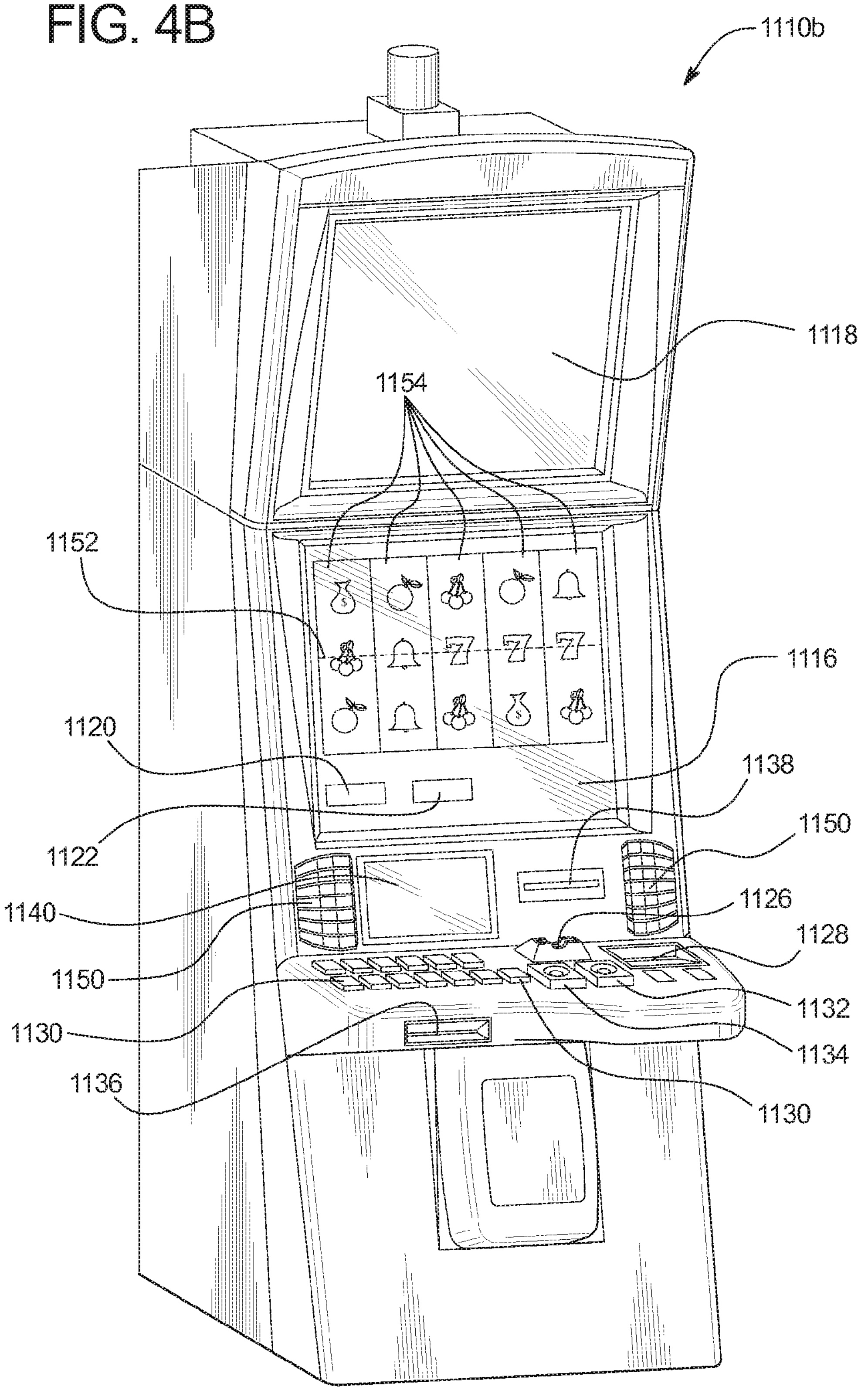

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

an acceptor;

at least one processor; and at least one memory device which stores a plurality of instructions, which when executed by the at least one processor cause the at least one processor to:

responsive to a physical item being received via the acceptor, establish a credit balance based, at least in part, on a monetary value associated with the received physical item, receive a placement of a wager on a play of a game, reduce the credit balance based on the placed wager, for the wagered on play of the game:

at each of a plurality of symbol display positions, cause the at least one display device to display at least one of a plurality of symbols, after displaying at least one symbol at each of the symbol display positions, for at least one of the symbol display positions, cause the at least one display device to display a plurality of the plurality of symbols at said symbol display position, wherein for at least one of the symbol display positions, the plurality of the plurality of symbols displayed at said symbol display position comprises a different quantity of displayed symbols than the at least one symbol displayed at said symbol display position, determine if any of the displayed symbols form any winning symbol combinations, wherein for each symbol display position, if a plurality of said displayed symbols are displayed at said symbol display position, said determination is based on each of said symbols displayed at said symbol display position, and if any winning symbol combinations are formed, cause the at least one display device to display one of a plurality of awards for each formed winning symbol combination, wherein the credit balance is increasable based on each award for each formed winning symbol combination, and responsive to a cashout input being received, cause an initiation of any payout associated with the credit balance.

2. The gaming system of claim 1, wherein when executed by the at least one processor, the plurality of instructions cause the at least one processor to determine a quantity of the plurality of symbols to display at one symbol display position based on a location of said symbol display position.

3. The gaming system of claim 1, wherein when executed by the at least one processor, the plurality of instructions cause the at least one processor to randomly determine a quantity of the plurality of symbols to display at one symbol display position.

4. The gaming system of claim 1, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

5. A gaming system comprising:

at least one display device;

an acceptor;

at least one processor; and at least one memory device which stores a plurality of instructions, which when executed by the at least one processor, cause the at least one processor to:

responsive to a physical item being received via the acceptor, establish a credit balance based, at least in part, on a monetary value associated with the received physical item, receive a placement of a wager on a play of a game, reduce the credit balance based on the placed wager, for the wagered on play of the game:

at each of a plurality of symbol display positions, cause the at least one display device to display one of a plurality of symbols, wherein the plurality of symbols includes at least one designated symbol, for each of any displayed designated symbols:

determine a quantity of symbols, said quantity being at least one, and at the symbol display position of said displayed designated symbol, cause the at least one display device to display the determined quantity of symbols, determine if any of the displayed symbols form any winning symbol combinations, wherein for each symbol display position, if a plurality of said displayed symbols are displayed at said symbol display position, said determination is based on each of said symbols displayed at said symbol display position, and if any winning symbol combinations are formed, cause the at least one display device to display one of a plurality of awards for each formed winning symbol combination, wherein the credit balance is increasable based on each award for each formed winning symbol combination, and responsive to a cashout input being received, cause an initiation of any payout associated with the credit balance.

6. The gaming system of claim 5, wherein when executed by the at least one processor, the plurality of instructions cause the at least one processor to determine, for each of any displayed designated symbols, the quantity of symbols based on a location of the symbol display position of the displayed designated symbol.

7. The gaming system of claim 5, wherein when executed by the at least one processor, the plurality of instructions cause the at least one processor to randomly determine, for each of any displayed designated symbols, the quantity of symbols.

8. The gaming system of claim 5, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

9. A gaming system server comprising:

at least one processor; and at least one memory device which stores a plurality of instructions, which when executed by the at least one processor, cause the at least one processor, for a play of a game associated with a placement of a wager, to:

at each of a plurality of symbol display positions, cause a display, via at least one display device, of at least one of a plurality of symbols, after causing the display at least one symbol at each of the symbol display positions, for at least one of the symbol display positions, cause a display, via the at least one display device, of a plurality of the plurality of symbols at said symbol display position, wherein for at least one of the symbol display positions, the plurality of the plurality of symbols displayed at said symbol display position comprises a different quantity of displayed symbols than the at least one symbol displayed at said symbol display position determine if any of the displayed symbols form any winning symbol combinations, wherein for each symbol display position, if a plurality of said displayed symbols are displayed at said symbol display position, said determination is based on each of said symbols displayed at said symbol display position, and if any winning symbol combinations are formed, cause a display, via the at least one display device, of one of a plurality of awards for each formed winning symbol combination, wherein at least one of the awards for at least one of any formed winning symbol combinations causes an increase of a credit balance which is increasable via an acceptor of a physical item associated with a monetary value, and decreasable via a cashout device.

10. The gaming system server of claim 9, wherein when executed by the at least one processor, the plurality of instructions cause the at least one processor to determine a quantity of the plurality of symbols to display at one symbol display position based on a location of said symbol display position.

11. The gaming system server of claim 9, wherein when executed by the at least one processor, the plurality of instructions cause the at least one processor to randomly determine a quantity of the plurality of symbols to display at one symbol display position.

12. The gaming system server of claim 9, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

13. A gaming system server comprising:

at least one processor; and at least one memory device which stores a plurality of instructions, which when executed by the at least one processor, cause the at least one processor, for a play of a game associated with a placement of a wager, to:

at each of a plurality of symbol display positions, cause a display, via at least one display device, of one of a plurality of symbols, wherein the plurality of symbols includes at least one designated symbol, for each of any displayed designated symbols:

determine a quantity of symbols, said quantity being at least one, and at the symbol display position of said displayed designated symbol, cause a display, via the at least one display device, of the determined quantity of symbols, determine if any of the displayed symbols form any winning symbol combinations, wherein for each symbol display position, if a plurality of said displayed symbols are displayed at said symbol display position, said determination is based on each of said symbols displayed at said symbol display position, and if any winning symbol combinations are formed, cause a display, via the at least one display device, of one of a plurality of awards for each formed winning symbol combination, wherein at least one of the awards for at least one of any formed winning symbol combinations causes an increase of a credit balance which is increasable via an acceptor of a physical item associated with a monetary value, and decreasable via a cashout device.

14. The gaming system server of claim 13, wherein when executed by the at least one processor, the plurality of instructions cause the at least one processor to determine, for each of any displayed designated symbols, the quantity of symbols based on a location of the symbol display position of the displayed designated symbol.

15. The gaming system server of claim 13, wherein when executed by the at least one processor, the plurality of instructions cause the at least one processor to randomly determine, for each of any displayed designated symbols, the quantity of symbols.

16. The gaming system server of claim 13, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

17. A gaming system comprising:

at least one processor; and at least one memory device which stores a plurality of instructions, which when executed by the at least one processor, cause the at least one processor, for a play of a game, to:

at each of a plurality of symbol display positions, cause a display, via at least one display device of a mobile device, of at least one of a plurality of symbols, after causing the display at least one symbol at each of the symbol display positions, for at least one of the symbol display positions, cause a display, via the at least one display device of the mobile device, of a plurality of the plurality of symbols at said symbol display position, wherein for at least one of the symbol display positions, the plurality of the plurality of symbols displayed at said symbol display position comprises a different quantity of displayed symbols than the at least one symbol displayed at said symbol display position determine if any of the displayed symbols form any winning symbol combinations, wherein for each symbol display position, if a plurality of said displayed symbols are displayed at said symbol display position, said determination is based on each of said symbols displayed at said symbol display position, and if any winning symbol combinations are formed, cause a display, via the at least one display device of the mobile device, of one of a plurality of awards for each formed winning symbol combination.

18. The gaming system of claim 17, wherein when executed by the at least one processor, the plurality of instructions cause the at least one processor to determine a quantity of the plurality of symbols to display at one symbol display position based on a location of said symbol display position.

19. The gaming system of claim 17, wherein when executed by the at least one processor, the plurality of instructions cause the at least one processor to randomly determine a quantity of the plurality of symbols to display at one symbol display position.

20. The gaming system of claim 17, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

21. The gaming system of claim 17, wherein when executed by the at least one processor, the plurality of instructions cause the at least one processor to communicate with the mobile device via a wireless network.

22. A gaming system comprising:

at least one processor; and at least one memory device which stores a plurality of instructions, which when executed by the at least one processor, cause the at least one processor, for a play of a game, to:

at each of a plurality of symbol display positions, cause a display, via at least one display device of a mobile device, of one of a plurality of symbols, wherein the plurality of symbols includes at least one designated symbol, for each of any displayed designated symbols:

determine a quantity of symbols, said quantity being at least one, and at the symbol display position of said displayed designated symbol, cause a display, via the at least one display device of the mobile device, of the determined quantity of symbols, determine if any of the displayed symbols form any winning symbol combinations, wherein for each symbol display position, if a plurality of said displayed symbols are displayed at said symbol display position, said determination is based on each of said symbols displayed at said symbol display position, and if any winning symbol combinations are formed, cause a display, via the at least one display device of the mobile device, of one of a plurality of awards for each formed winning symbol combination.

23. The gaming system of claim 22, wherein when executed by the at least one processor, the plurality of instructions cause the at least one processor to determine, for each of any displayed designated symbols, the quantity of symbols based on a location of the symbol display position of the displayed designated symbol.

24. The gaming system of claim 22, wherein when executed by the at least one processor, the plurality of instructions cause the at least one processor to randomly determine, for each of any displayed designated symbols, the quantity of symbols.

25. The gaming system of claim 22, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

26. The gaming system of claim 22, wherein when executed by the at least one processor, the plurality of instructions cause the at least one processor to communicate with the mobile device via a wireless network.

* * * * *